(12) United States Patent
Tojo et al.

(10) Patent No.: US 7,272,269 B2
(45) Date of Patent: Sep. 18, 2007

(54) IMAGE PROCESSING APPARATUS AND METHOD THEREFOR

(75) Inventors: Hiroshi Tojo, Tokyo (JP); Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 10/828,476

(22) Filed: Apr. 21, 2004

(65) Prior Publication Data

US 2004/0218838 A1  Nov. 4, 2004

(30) Foreign Application Priority Data

Apr. 30, 2003 (JP) .............................. 2003-125814

(51) Int. Cl.
G06K 9/54 (2006.01)
G06K 9/60 (2006.01)

(52) U.S. Cl. ........................ 382/305; 382/173; 382/195

(58) Field of Classification Search ................ 382/164, 382/165, 173, 176, 190, 195, 203, 282, 305, 382/306

See application file for complete search history.

(56) References Cited

U.S. PATENT DOCUMENTS 5,751,286 A * 5/1998 Barber et al. ............... 715/835
5,917,940 A * 6/1999 Okajima et al. ............. 382/173
6,181,818 B1 * 1/2001 Sato et al. ................... 382/170
6,411,291 B2 6/2002 Shiiyama ..................... 345/419
6,647,157 B1 11/2003 Shiiyama et al. ............ 382/305
6,665,442 B2 12/2003 Sekiguchi et al. ........... 382/224
6,792,164 B2 9/2004 Syeda-Mahmood ......... 382/305

FOREIGN PATENT DOCUMENTS

| CN | 1329323 | 1/2002 |
|---|---|---|
| CN | 1341247 | 3/2002 |
| CN | 1413458 | 4/2003 |
| JP | 8-249349 | 9/1996 |
| JP | 2001-257862 | 9/2001 |
| WO | WO 00/46748 | 8/2000 |

* cited by examiner

*Primary Examiner*—Phuoc Tran
(74) *Attorney, Agent, or Firm*—Fitzpatrick, Cella, Harper & Scinto

(57) ABSTRACT

A reference comparison image obtained from a printed material is input. The grayscale feature amount of the reference comparison image is extracted. Using the extracted grayscale feature amount, a target comparison image corresponding to the reference comparison image is retrieved from a plurality of electronic data stored as target comparison images in a storage medium. The retrieved image is extracted from the storage medium and processed.

16 Claims, 23 Drawing Sheets

FIG. 4

| DOCUMENT ID | ADDRESS |
|---|---|
| 0000001 | ¥¥abc¥doc¥ship.doc |
| 0000002 | C:¥img¥car.bmp |

FIG. 5

| DOCUMENT ID | BLOCK ID | ATTRIBUTE | SIZE | POSITION |
|---|---|---|---|---|
| 0000001 | 0001 | IMAGE | 30 | 5, 5 |
| 0000001 | 0002 | IMAGE | 40 | 5, 50 |
| 0000001 | 0003 | CHARACTER | 30 | 80, 5 |
| 0000002 | 0001 | IMAGE | 30 | 15, 5 |
| 0000002 | 0002 | IMAGE | 35 | 15, 50 |
| 0000002 | 0003 | CHARACTER | 35 | 75, 5 |

FIG. 6

| DOCUMENT ID | BLOCK ID | BRIGHTNESS FEATURE AMOUNT |
|---|---|---|
| 0000001 | 0001 | ..... |
| 0000002 | 0002 | ..... |

FIG. 7

| IMAGE ID | BLOCK ID | COLOR FEATURE AMOUNT |
|----------|----------|----------------------|
| 0000001  | 0002     | . . .                |
| 0000002  | 0001     | . . .                |

FIG. 8

| IMAGE ID | BLOCK ID | TEXT FEATURE AMOUNT |
|---|---|---|
| 0000001 | 0003 | · · · · |
| 0000002 | 0003 | · · · · |

F I G. 12

| 1 | 2 | 4 |
|---|---|---|
| 3 | 5 | 7 |
| 6 | 8 | 9 |

FIG. 13

| RANK ID | 0 | 1 | 2 | 3 | 4 | ~ | 15 | 16 |
|---|---|---|---|---|---|---|---|---|
| RANGE | 0–15 | 16–31 | 32–47 | 48–63 | 64–79 | ~ | 222–238 | 239–255 |
| FREQUENCY | | | | | | | | |

F I G. 15
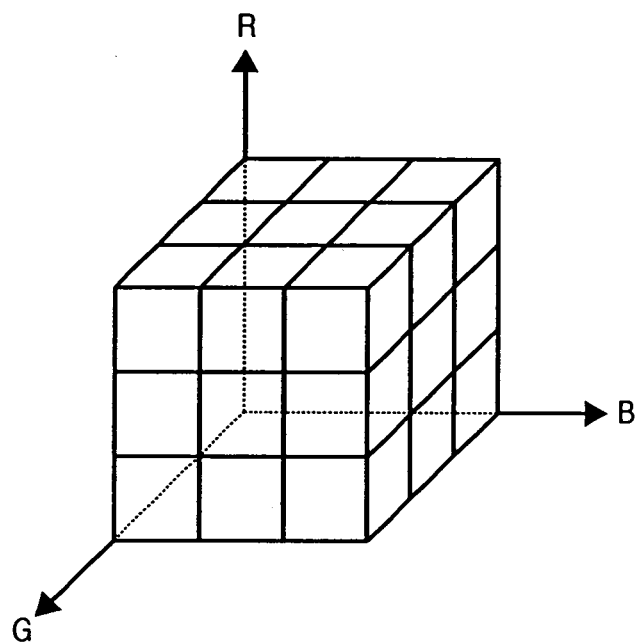

FIG. 20

|   | 1 | 2 | 3 | 4 | 5 | 6 | 7 | 8 | · · · · |
|---|---|---|---|---|---|---|---|---|---------|
| 1 | 0 | 1 | 1 | 5 | 1 | 5 | 7 | 7 | · · · · |
| 2 |   | 0 | 2 | 1 | 1 | 7 | 2 | 5 | · · · · |
| 3 |   |   | 0 | 7 | 1 | 1 | 5 | 2 | · · · · |
| 4 |   |   |   | 0 | 1 | 9 | 1 | 7 | · · · · |
| : |   |   |   |   |   |   |   |   |         |

F I G. 22

|   | 1 | 2 | 3 | 4 | 5 | 6 | 7 | 8 | · · · · |
|---|---|---|---|---|---|---|---|---|---|
| 1 | 0 | 8 | 16 | 24 | 32 | 40 | 48 | 56 | · · · · |
| 2 |   | 0 | 8 | 16 | 24 | 32 | 40 | 48 | · · · · |
| 3 |   |   | 0 | 8 | 16 | 24 | 32 | 40 | · · · · |
| 4 |   |   |   | 0 | 8 | 16 | 24 | 32 | · · · · |
| ⋮ |   |   |   |   |   |   |   |   |   |

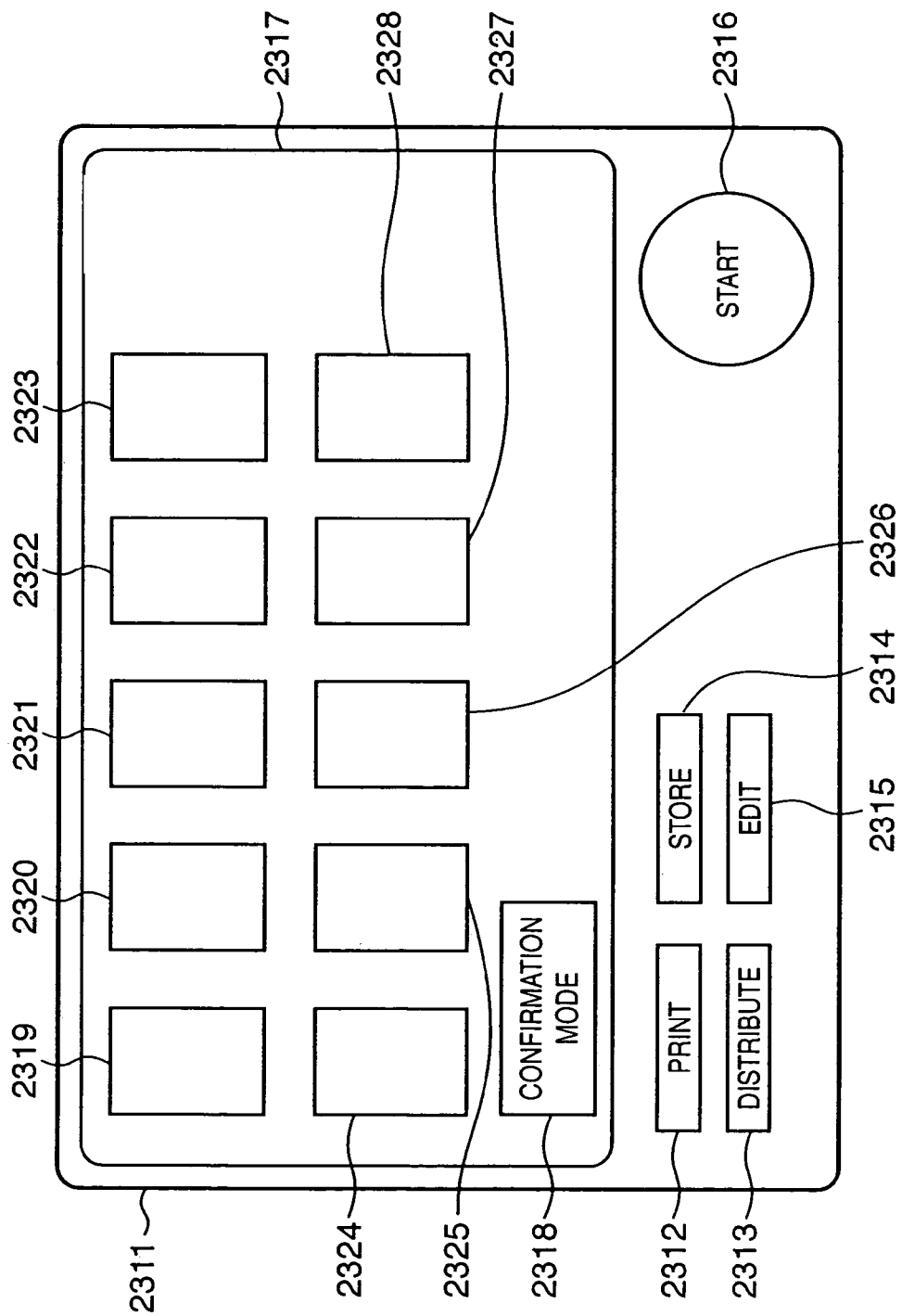

IMAGE PROCESSING APPARATUS AND METHOD THEREFOR

FIELD OF THE INVENTION

The present invention relates to an image processing technique capable of retrieving original electronic data corresponding to a paper document read by an image input apparatus such as a copying machine, and utilizing the original electronic data for printing, distribution, storage, editing, and the like.

BACKGROUND OF THE INVENTION

Recently, the development of word processing software and the spread of digital cameras facilitate importing an image in a document, and documents containing color images become popular. Digital copying machines and network copying machines have also advanced.

In this situation, electronic data of paper documents distributed at a meeting and the like can be managed in, e.g., a document management server. If necessary, electronic data managed in the document management server can be retrieved and subjected to various processes.

These processes include, for example, printing of retrieved electronic data, distribution to a terminal such as a desired personal computer (PC) within a network, save in a desired storage medium within a network, and editing.

One of retrieval methods of retrieving electronic data is to retrieve desired electronic data from the document management server by using text data contained in electronic data as a retrieval condition.

In Japanese Patent Laid-Open No. 2001-257862, when a paper document is to be converted into electronic data, an identification code is added to the electronic data to generate a printed material containing the identification code. To retrieve or print electronic data corresponding to the printed material, the printed material is loaded to recognize the identification code printed on the material, thereby retrieving or printing desired electronic data.

When a paper document to be distributed is created from original document data of color images, the purpose is reference/confirmation, and many copies must be formed. Thus, a paper document for such purpose is generally a paper document of grayscale images prepared by copying an original paper document by a copying machine or a paper document of monochrome images prepared by printing original document data by a monochrome printer.

In retrieving original document data from electronic data of a paper document containing a grayscale or monochrome image, when the original document data is formed by only text data, it can be accurately retrieved using the text data as a retrieval condition.

If, however, original document data contains a color image and is retrieved using text data as a retrieval condition, desired original document data cannot be retrieved or satisfactory precision cannot be obtained when the text data are identical but images are different.

In Japanese Patent Laid-Open No. 2001-257862, original document data needs to be printed once together with an identification code, and thus a change is inevitable for the original document data. A change not intended by the user is added to the original document data.

For example, to manage electronic data created by word processing software or the like as original document data, the electronic data is printed once, the printed material is loaded as electronic data, and then the electronic data is printed together with an identification code. Further, the printed material with the identification code is loaded as electronic data, resulting in cumbersome procedures.

SUMMARY OF THE INVENTION

The present invention has been made to overcome the conventional drawbacks, and has as its object to provide an image processing technique capable of retrieving original color electronic data from a paper document printed in the grayscale, utilizing the data, and easily exploiting not only a scanned image of a paper document but also an electronic file of the paper document created by word processing software without changing the original.

According to the present invention, the foregoing object is attained by providing an image processing apparatus comprising:

storage means for storing a plurality of electronic data as target comparison images;

input means for inputting a reference comparison image obtained from a printed material;

grayscale feature amount extraction means for extracting a grayscale feature amount of the reference comparison image;

retrieval means for retrieving a target comparison image corresponding to the reference comparison image from the storage means by using the grayscale feature amount extracted by the grayscale feature amount extraction means; and processing means for extracting the image retrieved by the retrieval means from the storage means and processing the extracted image.

In a preferred embodiment, the apparatus wherein the grayscale feature amount comprises of one or an arbitrary combination of a plurality of types of a brightness feature amount, or a texture feature amount, or a shape feature amount of the reference comparison image.

In a preferred embodiment, the retrieval means compares a grayscale feature amount of the reference comparison image and a grayscale feature amount of the target comparison image, and outputs a similar target comparison image as a retrieval result.

In a preferred embodiment, the apparatus further comprises color feature amount extraction means for extracting a color feature amount of a color of the reference comparison image, wherein the retrieval means retrieves the target comparison image corresponding to the reference comparison image from the storage means on the basis of the grayscale feature amount of the reference comparison image and the color feature amount of the reference comparison image.

In a preferred embodiment, the color feature amount includes at least one of a mode color and an average color in the reference comparison image.

In a preferred embodiment, the apparatus further comprises determination means for determining whether to retrieve the reference comparison image on the basis of color information, wherein when the determination means determines to retrieve the reference comparison image on the basis of color information, the color feature amount extraction means extracts the color feature amount of the reference comparison image, and the retrieval means retrieves the target comparison image corresponding to the reference comparison image from the storage means on the basis of the extracted color feature amount of the reference comparison image, and when the determination means determines not to retrieve the reference comparison image on the basis of color information, the grayscale feature amount extraction means extracts the grayscale feature amount of the reference comparison image, and the retrieval means retrieves the target comparison image corresponding to the reference comparison image from the storage means on the basis of the extracted grayscale feature amount of the reference comparison image.

In a preferred embodiment, the apparatus further comprises:

display means for displaying a retrieval result by the retrieval means; and selection means for, when the display means displays a plurality of target comparison images as retrieval results by the retrieval means, selecting a desired image from the plurality of target comparison images, wherein the processing means extracts the image selected by the selection means from the storage means, and executes a process for the extracted image.

In a preferred embodiment, the apparatus further comprises designation means for designating a type of process for the image retrieved by the retrieval means, wherein the processing means extracts the retrieved image and executes the designated process on the basis of the type of process designated by the designation means.

In a preferred embodiment, the designation means can designate at least one process from printing, distribution, storage, and editing.

In a preferred embodiment, the apparatus further comprises segmentation means for segmenting the reference comparison image into a plurality of regions on the basis of an attribute, wherein the grayscale feature amount extraction means extracts the grayscale feature amount from a region having a predetermined attribute among the plurality of regions segmented by the segmentation means.

In a preferred embodiment, the apparatus further comprises segmentation means for segmenting the reference comparison image into a plurality of regions on the basis of an attribute, wherein the grayscale feature amount extraction means extracts the grayscale feature amount from a region having a first attribute among the plurality of regions segmented by the segmentation means, and the color feature amount extraction means extracts the color feature amount from a region having a second attribute among the plurality of regions segmented by the segmentation means.

In a preferred embodiment, the apparatus further comprises:

text feature amount extraction means for extracting a text feature amount of a text image in the reference comparison image; and segmentation means for segmenting the reference comparison image into a plurality of regions on the basis of an attribute, wherein the grayscale feature amount extraction means extracts the grayscale feature amount from a region having a first attribute among the plurality of regions segmented by the segmentation means, the text feature amount extraction means extracts the text feature amount from a region having a text attribute among the plurality of regions segmented by the segmentation means, and the retrieval means retrieves the target comparison image corresponding to the reference comparison image from the storage means by using the grayscale feature amount extracted by the grayscale feature amount extraction means and the text feature amount extracted by the text feature amount extraction means.

In a preferred embodiment, the apparatus further comprises:

color feature amount extraction means for extracting a color feature amount of a color of an image;

text feature amount extraction means for extracting a text feature amount of a text image;

segmentation means for segmenting the reference comparison image into a plurality of regions on the basis of an attribute; and determination means for determining whether to retrieve a region having a predetermined attribute among the regions segmented by the segmentation means on the basis of color information, wherein the grayscale feature amount extraction means extracts the grayscale feature amount from a region determined by the determination means not to undergo retrieval based on the color information, the color feature amount extraction means extracts the color feature amount from a region determined by the determination means to undergo retrieval based on the color information, the text feature amount extraction means extracts the text feature amount from a region having a text attribute among the regions segmented by the segmentation means, and the retrieval means retrieves the target comparison image corresponding to the reference comparison image from the storage means on the basis of the extracted grayscale feature amount, the extracted color feature amount, and the extracted text feature amount.

In a preferred embodiment, the region having the predetermined attribute includes an image block, and the region having the text attribute includes a text block.

In a preferred embodiment, the apparatus further comprises registration means for extracting a feature amount from a registration image and registering the feature amount as the reference comparison image in the storage means.

In a preferred embodiment, the feature amount extracted by the registration means includes the grayscale feature amount.

In a preferred embodiment, the apparatus further comprises segmentation means for segmenting the registration image into a plurality of regions on the basis of an attribute, wherein the registration means extracts and registers a feature amount corresponding to an attribute of the region segmented by the segmentation means.

According to the present invention, the foregoing object is attained by providing an image processing method comprising:

an input step of inputting a reference comparison image obtained from a printed material;

a grayscale feature amount extraction step of extracting a grayscale feature amount of the reference comparison image;

a retrieval step of retrieving a target comparison image corresponding to the reference comparison image from a plurality of electronic data stored as target comparison images in a storage medium, by using the grayscale feature amount extracted in the grayscale feature amount extraction step; and a process step of extracting the image retrieved in the retrieval step from the storage medium and processing the extracted image.

According to the present invention, the foregoing object is attained by providing a program comprising:

a program code for an input step of inputting a reference comparison image obtained from a printed material;

a program code for a grayscale feature amount extraction step of extracting a grayscale feature amount of the reference comparison image;

a program code for a retrieval step of retrieving a target comparison image corresponding to the reference comparison image from a plurality of electronic data stored as target comparison images in a storage medium, by using the grayscale feature amount extracted in the grayscale feature amount extraction step; and a program code for a process step of extracting the image retrieved in the retrieval step from the storage medium and processing the extracted image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a table showing an example of address information according to the embodiment of the present invention;

FIG. 5 is a table showing an example of block information according to the embodiment of the present invention;

FIG. 6 is a table showing an example of feature amount information according to the embodiment of the present invention;

FIG. 7 is a table showing another example of feature amount information according to the embodiment of the present invention;

FIG. 8 is a table showing still another example of feature amount information according to the embodiment of the present invention;

FIG. 12 is a view showing an example of an order decision table according to the embodiment of the present invention;

FIG. 13 is a table showing an example of a brightness rank table according to the embodiment of the present invention;

FIG. 15 is a view showing an example of the arrangement of color bins in the color space according to the embodiment of the present invention;

FIG. 20 is a view showing an example of the structure of a color bin penalty matrix according to the embodiment of the present invention;

FIG. 22 is a view showing an example of the structure of a brightness rank ID penalty matrix according to the embodiment of the present invention; and FIG. 23 is a view showing an example of a user interface according to the embodiment of the present invention.

DETAILED DESCRIPTION OF THE PREFERRED EMBODIMENT

A preferred embodiment of the present invention will be described in detail in accordance with the accompanying drawings.

Figure 1:
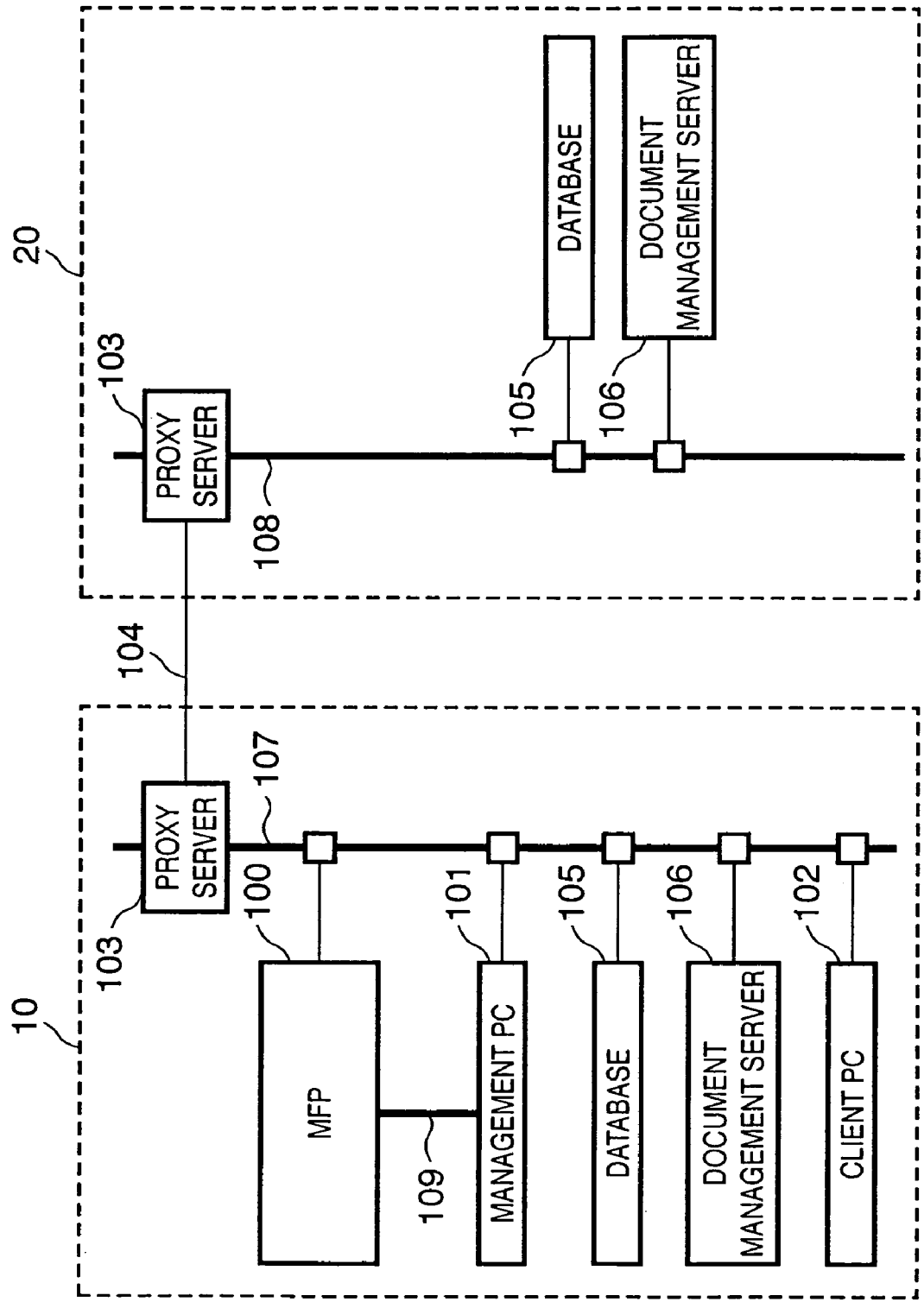
FIG. 1 is a block diagram showing the configuration of an image processing system according to an embodiment of the present invention.

FIG. 1 is a block diagram showing the configuration of an image processing system according to the embodiment of the present invention.

The image processing system is implemented in an environment where offices 10 and 20 are connected by a network 104 such as the Internet.

A LAN 107 constructed in the office 10 is connected to an MFP (Multi Function Peripheral) 100 serving as a multifunction apparatus which realizes a plurality of types of functions, a management PC 101 which controls the MFP 100, a client PC 102, a document management server 106, a database 105 for the server 106, and a proxy server 103.

The LAN 107 in the office 10 and a LAN 108 in the office 20 are connected to the network 104 via the proxy servers 103 of the two offices.

The MFP 100 comprises an image reader which electronically reads particularly a paper document, and an image processor which executes image processes for an image signal obtained from the image reader. The image signal can be transmitted to the management PC 101 via a LAN 109.

The management PC 101 is a general PC, and incorporates various building components such as an image storage unit, image processor, display, and input unit. Some of the building components are integrated into the MFP 100.

The network 104 is a so-called communication network which is typically realized by one or a combination of the Internet, LAN, WAN, telephone line, dedicated digital circuit, ATM, frame relay line, communication satellite channel, cable television line, data broadcasting radio channel, and the like as far as the network enables data exchange.

Various terminals such as the management PC 101, client PC 102, and document management server 106 each have standard building components (e.g., CPU, RAM, ROM, hard disk, external storage, network interface, display, keyboard, and mouse) which are standard equipment for a general-purpose computer.

The detailed arrangement of the MFP 100 will be explained with reference to FIG. 2.

Figure 2:
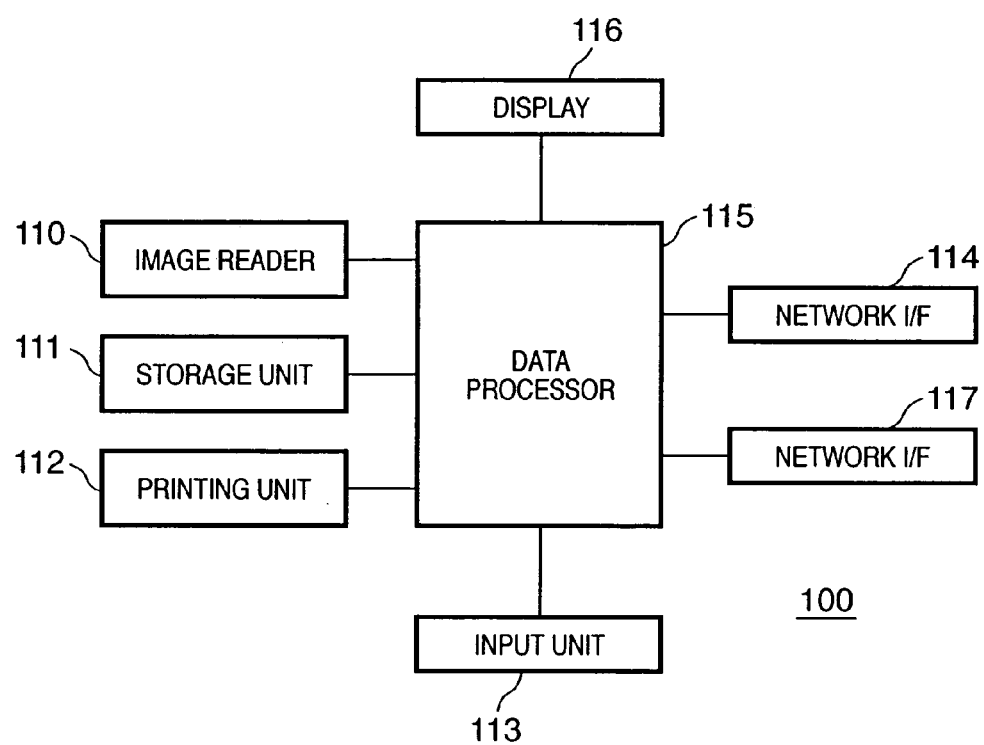
FIG. 2 is a block diagram showing the detailed arrangement of an MFP according to the embodiment of the present invention.

FIG. 2 is a block diagram showing the detailed arrangement of the MFP according to the embodiment of the present invention.

In FIG. 2, an image reader 110 including an auto document feeder (ADF) irradiates a bundle or one of document images with a light source (not shown), forms a reflected document image on a solid-state image sensing element via a lens, and obtains a raster image reading signal from the solid-state image sensing element as a raster image at a predetermined density (600 DPI or the like).

The MFP 100 has a copying function of printing an image corresponding to an image reading signal on a printing medium by a printing unit 112. To form a copy of a document image, the image reading signal is processed by a data processor 115 to generate a printing signal, and the printing signal is printed on a printing medium by the printing unit 112. To form copies of a document image, a printing signal for one copy is temporarily stored and held in a storage unit 111, and such printing signals are sequentially output to the printing unit 112 to print them on printing media.

A printing signal output from the client PC 102 is received by the data processor 115 via the LAN 107 and a network I/F 114. The data processor 115 converts the printing signal into raster data printable by the printing unit 112, and the printing unit 112 prints the data on a printing medium.

An instruction from the operator to the MFP 100 is input from an input unit 113 formed by a key operation unit attached to the MFP 100 and a keyboard and mouse connected to the management PC 101. A series of operations are controlled by a controller (not shown) in the data processor 115. An operation input state and image data during processing are displayed on a display 116.

The storage unit 111 is also controlled by the management PC 101. Data exchange and control between the MFP 100 and the management PC 101 are performed via a network I/F 117 and the LAN 109.

Outline of Processes

Figure 3A:
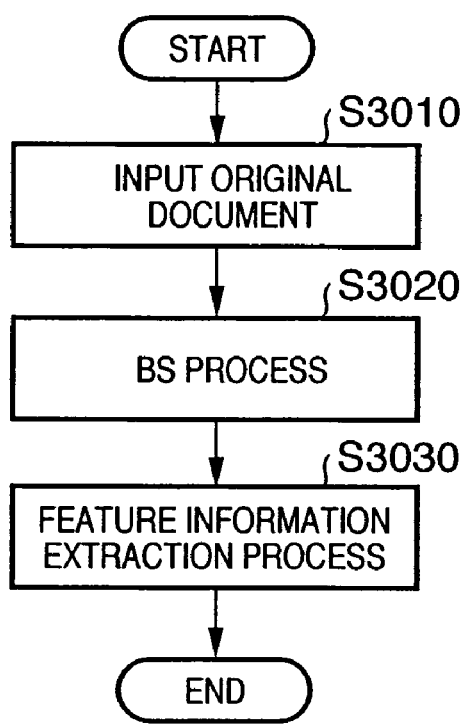
FIGS. 3A and 3B are flow charts showing the outline of overall processing executed by the image processing system according to the embodiment of the present invention.
Figure 3B:
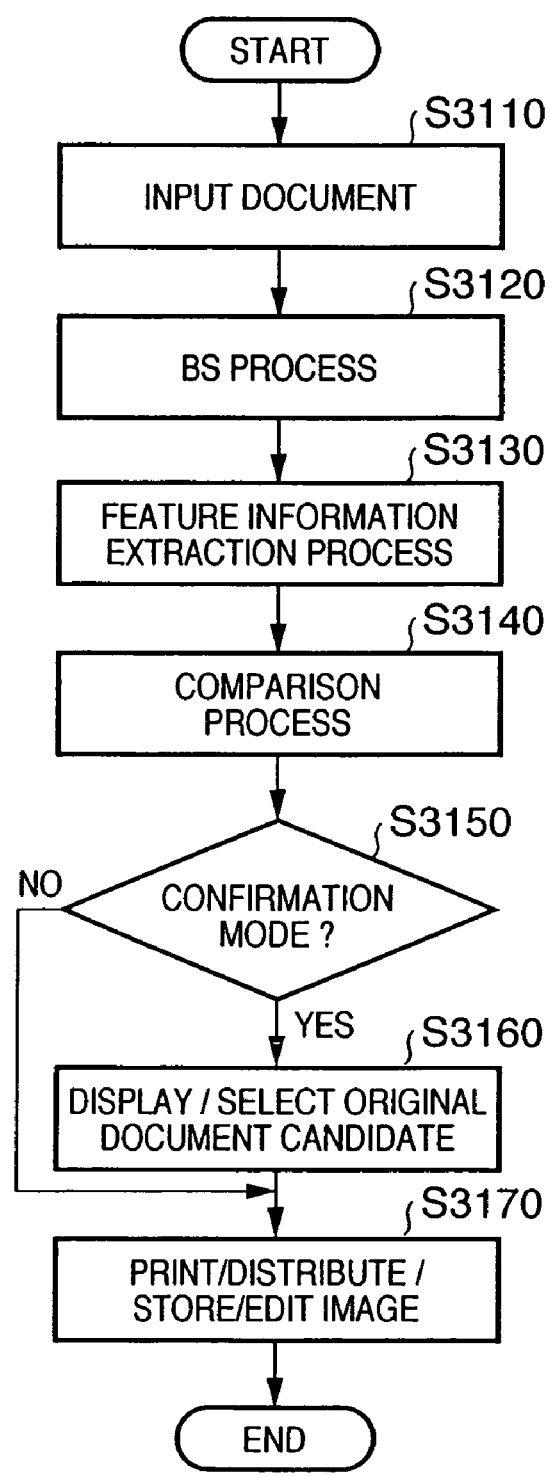

The outline of processes executed by the image processing system according to the present invention will be described with reference to the flow charts of FIGS. 3A and 3B. Processes executed by the image processing system are roughly classified into two processes: a registration process of registering electronic data of an original document and a retrieval process of retrieving electronic data of a desired original document.

(a) Outline of Registration Process

The outline of the registration process of registering an original document will be described with reference to FIG. 3A.

In step S3010, an original document to be registered is input. Along with this input, various pieces of information for managing an original document are generated and stored in the storage unit 111.

There are two original document input methods in registering an original document.

When the original document is electronic data, the electronic data is stored in the hard disk of the client PC 102, the database 105 of the document management server 106 in the office 10 or 20, or the storage unit 111 of the MFP 100. Electronic data of an original document to be registered is read out from the storage source, input to the data processor 115 via the network I/F 114, and converted into a raster image by the data processor 115.

When the original document is a paper document, the paper document is raster-scanned by the image reader 110 of the MFP 100 to obtain a raster image.

In this manner, the embodiment can process both electronic data and a paper document as an original document to be registered. The raster image undergoes a pre-process by the data processor 115 and saved in the storage unit 111 (in subsequent processes, the raster image is used as electronic data of an original document for a paper document). At this time, a unique document ID is issued for each original document to be registered, and saved as address information in the storage unit 111 in correspondence with the address of the electronic data of the original document.

The address is full path information which is formed by a URL, server name, directory, and file name and represents an electronic data storage destination. An example of address information is shown in FIG. 4. The electronic data storage destination is the database 105, storage unit 111, or the like.

In step S3020, the data processor 115 performs a block selection (BS) process. This process is executed under the control of the management PC 101.

More specifically, the CPU of the management PC 101 segments the raster image of the original document to be processed that is stored in the storage unit 111, into a text/line image part and halftone image part. The CPU further segments the text/line part into blocks of paragraphs, or tables or pictures formed by lines.

The halftone image part is segmented into blocks such as an image part and background part of blocks separated into rectangles.

A block ID which specifies each block is issued, and the attribute (image, text, or the like) of each block, the size, the position (coordinates) in the original document, and the block are associated and stored as block information in the storage unit 111. An example of the block information is shown in FIG. 5.

In step S3030, the data processor 115 performs a feature information extraction process of extracting feature information of each block in accordance with the attribute of the block.

Especially, a text block undergoes an OCR process to extract a character code as a text feature amount. An image feature amount pertaining to the brightness or color is extracted from an image block. At this time, feature amounts corresponding to respective blocks are integrated for each original document, and stored as feature amount information in the storage unit 111 in association with a document ID and block ID. Examples of feature amount information are shown in FIGS. 6 to 8.

(b) Outline of Retrieval Process

The outline of the retrieval process of retrieving electronic data of an original document will be described with reference to FIG. 3B.

In step S3110, a paper document serving as a retrieval condition is input. This process is the same as the process in step S3010, and a description thereof will be omitted. Note that a raster image generated by this process is merely temporarily saved, and address information for the paper document need not be saved in the storage unit 111.

In the embodiment, a paper document is loaded, its electronic data is used to retrieve electronic data of an original document. It can also be possible to load a printed material other than paper, e.g., a material printed on a printing medium such as an OHP sheet or cloth and retrieve electronic data of an original document.

In step S3120, the block selection (BS) process is done. This process is the same as the process in step S3020, and a description thereof will be omitted. Note that the attribute, size, and position of each block generated by this process are merely temporarily saved, and block information for the paper document need not be saved in the storage unit 111.

In step S3130, a feature information extraction process of extracting feature information of each block is executed. This process is the same as the process in step S3030, and a description thereof will be omitted. Note that the feature amount of each block generated by this process is merely temporarily saved, and feature amount information for the paper document need not be saved in the storage unit 111.

In step S3140, feature amount information of the input paper document (reference comparison image) and feature amount information of the electronic data (target comparison image) stored in the hard disk of the client PC 102, the database 105 of the document management server 106 in the office 10 or 20, or the storage unit 111 of the MFP 100 are compared to calculate the similarity. An original document candidate is determined as a retrieval result on the basis of the similarity.

In step S3150, whether a user confirmation mode has been set is determined.

In the user confirmation mode, whether an original document desired by the user has been retrieved from original document candidates obtained by a comparison process is confirmed. More specifically, a user interface containing original document candidates is implemented by the display 116 and input unit 113. The user interface allows the user to confirm the contents of the original document candidates.

If no user confirmation mode is set (NO in step S3150), the process advances to step S3170. If the user confirmation mode is set (YES in step S3150), the process advances to step S3160 to display/select an original document candidate. This selection is realized by displaying the thumbnail images of original document candidates on the display 116 and prompting the user to select the thumbnail image of a desired original document candidate from the original document candidates.

In step S3170, the selected original document is extracted from the database 105. One of printing, distribution, storage, and editing of the original document is executed for the extracted original document on the basis of a manipulation by the user via the user interface implemented by the display 116 and input unit 113.

The detailed arrangement of the user interface will be described later.

Details of Each Process

Details of each process will be explained.

Details of the block selection process in steps S3020 and S3120 will be described.

Figure 9A:
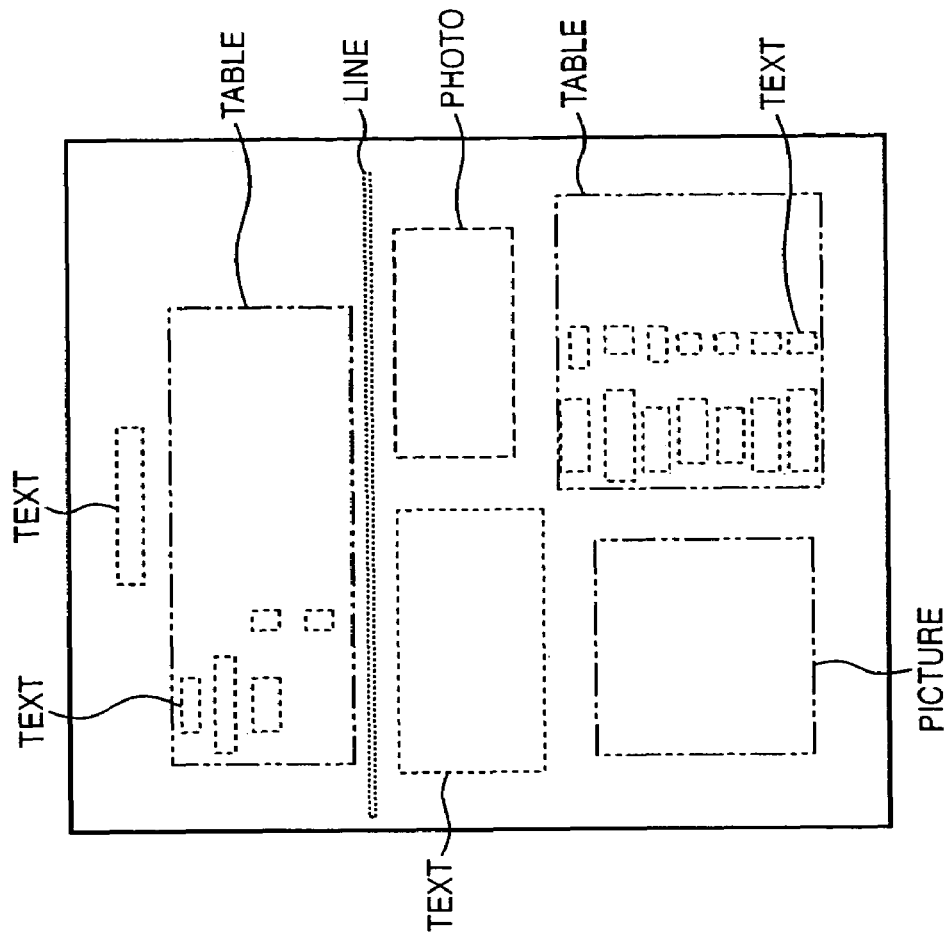
FIGS. 9A and 9B are views for explaining the concept of a block selection process according to the embodiment of the present invention.
Figure 9B:
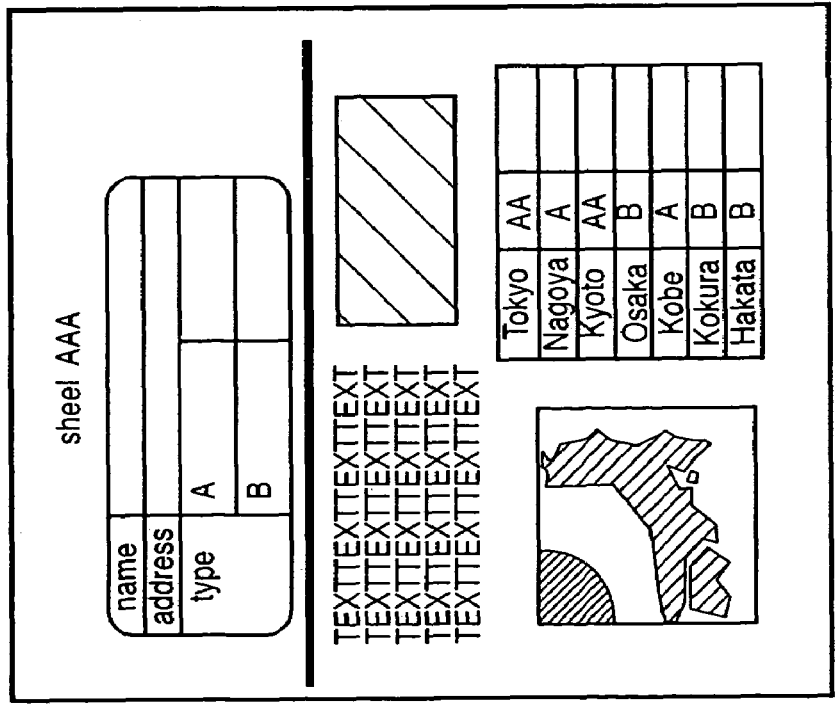

In the block selection process, for example, a raster image in FIG. 9A is recognized as meaningful blocks, as shown in FIG. 9B. The attributes (e.g., TEXT/PICTURE/PHOTO/LINE/TABLE) of the blocks are determined to segment the image into blocks having different attributes.

An embodiment of the block selection process will be described below.

An input image is binarized into a monochrome image, and edge tracking is performed to extract a cluster of pixels surrounded by a black pixel edge. In a cluster of black pixels in a large area, edge tracking is also performed for internal white pixels to extract a cluster of white pixels. Further, a cluster of black pixels is recursively extracted from the cluster of white pixels with a predetermined area or more.

Obtained clusters of black pixels are classified by size and shape into blocks having different attributes. For example, a block having an aspect ratio of almost 1 and a size of a predetermined range is defined as a pixel cluster corresponding to a text. A part of adjacent characters which can be neatly grouped is defined as a text block. A plane pixel cluster is defined as a line block. A range of a black pixel cluster which neatly contains rectangular white pixel clusters with a predetermined size or more is defined as a table block. A region where indefinite pixel clusters scatter is defined as a photo block. A pixel cluster with another arbitrary shape is defined as a picture block.

Details of the feature information extraction process in steps S3030 and S3130 will be explained.

The feature information extraction process adopts different processing methods for an image block and text block, and these methods will be separately described.

Image blocks include photo and picture blocks in the example of FIG. 9B, but can be limited to at least one of photo and picture blocks in accordance with the application purpose.

A feature information extraction process for an image block will be described.

When one document contains a plurality of image blocks, the following process is repeated by the total number of image blocks.

As an example of the feature information extraction process, the embodiment executes a brightness feature information extraction process of extracting the brightness feature amount of the image brightness, and a color feature information extraction process of extracting the color feature amount of the image color.

Details of the brightness feature information extraction process will be explained with reference to FIG. 10.

Figure 10:
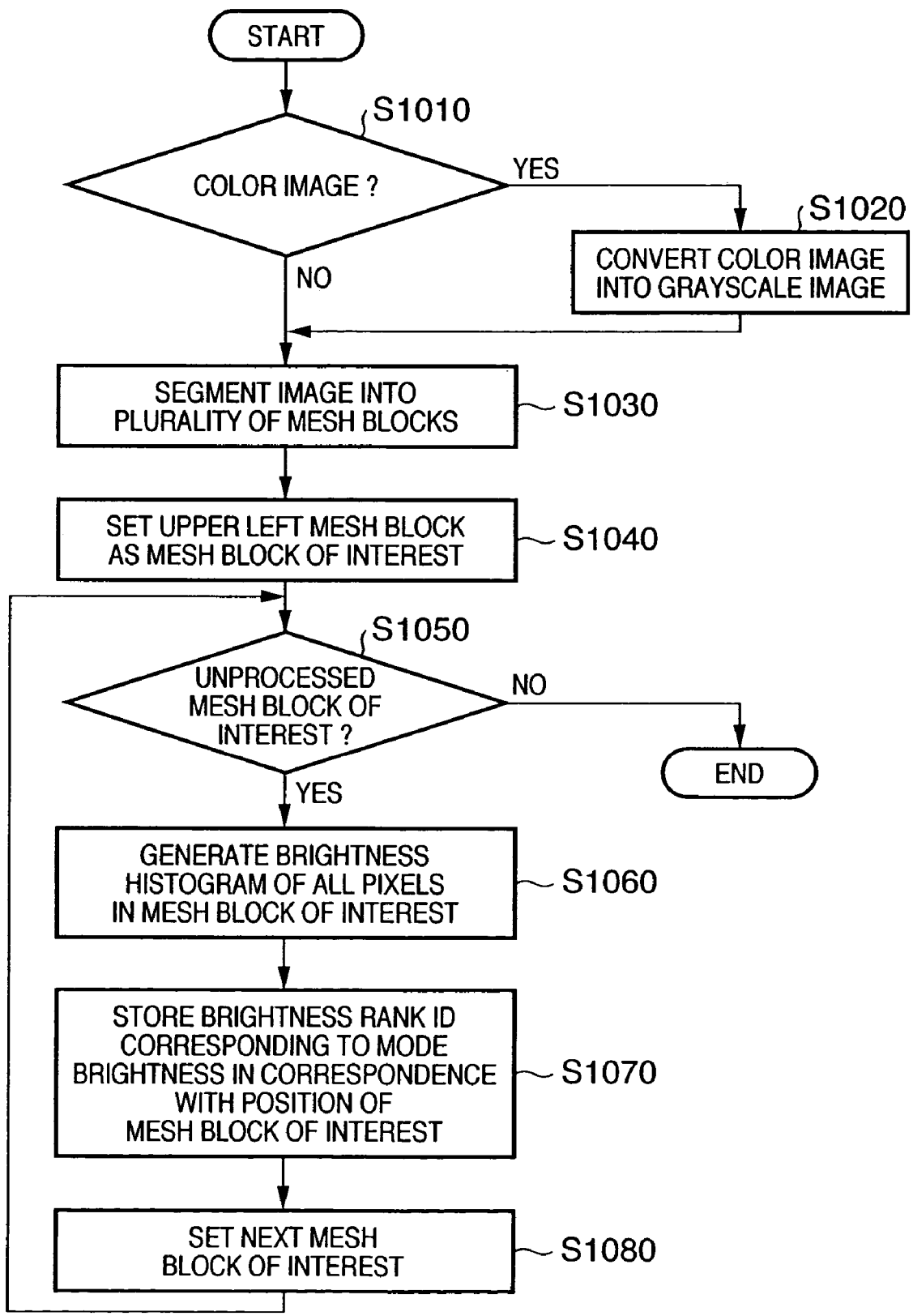
FIG. 10 is a flow chart showing details of a brightness feature information extraction process according to the embodiment of the present invention.

FIG. 10 is a flow chart showing details of the brightness feature information extraction process according to the embodiment of the present invention.

In this process, information which makes a brightness rank corresponding to a mode brightness in the brightness histogram of each mesh block prepared by segmenting an image to be processed (image block extracted by the block selection process) into a plurality of mesh blocks and position information of the mesh block correspond to each other is extracted as brightness feature information.

In step S1010, whether an image to be processed is a color image (color image or grayscale image) is determined. Details of this process will be described later.

If the image to be processed is not a color image in step S1010 (NO in step S1010), the process advances to step S1030. If the image is a color image (YES in step S1010), the process advances to step S1020 to convert the color image into a grayscale image (8 bits: 256 gray levels).

Conversion is executed using a known RGB color matrix. For example, when the YCbCr color space is used, the relationship between the value of the luminance Y representing a grayscale value and R, G, and B values (8 bits each: a total of 24 bits) is given by $$Y=0.29900*R+0.58700*G+0.11400*B \qquad (1)$$

The value of the luminance Y can be calculated from equation (1).

In step S1030, the image to be processed is segmented into a plurality of mesh blocks.

Figure 11:
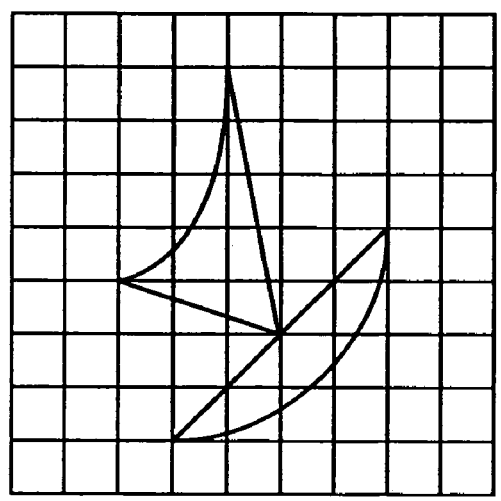
FIG. 11 is a view showing an example of image mesh block segmentation according to the embodiment of the present invention.

In the embodiment, as shown in FIG. 11, the image is segmented into nine mesh blocks in the vertical and horizontal directions each. The embodiment exemplifies segmentation into 9×9=81 mesh blocks for illustrative convenience. In practice, the number of mesh blocks is preferably about 8 to 15.

Figure 12:
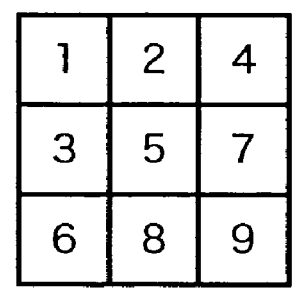

In step S1040, a mesh block of interest to be processed is set to the upper left mesh block. The mesh block of interest is set by looking up, e.g., an order decision table which decides a processing order in advance, as shown in FIG. 12.

In step S1050, whether an unprocessed mesh block of interest exists is determined. If no unprocessed mesh block of interest exists (NO in step S1050), the process ends. If an unprocessed mesh block of interest exists (YES in step S1050), the process advances to step S1060.

In step S1060, the brightness histogram of all pixels in the mesh block of interest is generated. In step S1070, a brightness rank ID within the mode brightness range of the brightness histogram is determined as the representative brightness of the mesh block of interest by looking up a brightness rank table in FIG. 13. The determined brightness rank ID is stored in the storage unit 111 in correspondence with the mesh block of interest and its position.

In the brightness rank table in FIG. 13, a rank is set for an 8-bit brightness signal in each predetermined brightness range.

In step S1080, the next mesh block of interest to be processed is set by looking up the order decision table in FIG. 12. After that, the flow returns to step S1050 to recursively repeat the processes in steps S1050 to S1080 until no unprocessed mesh block of interest exists.

By the above process, information which makes the representative brightness of each mesh block of an image (image block) to be processed and position information of the mesh block correspond to each other can be extracted as brightness feature information.

Details of the color feature information extraction process will be explained with reference to FIG. 14.

Figure 14:
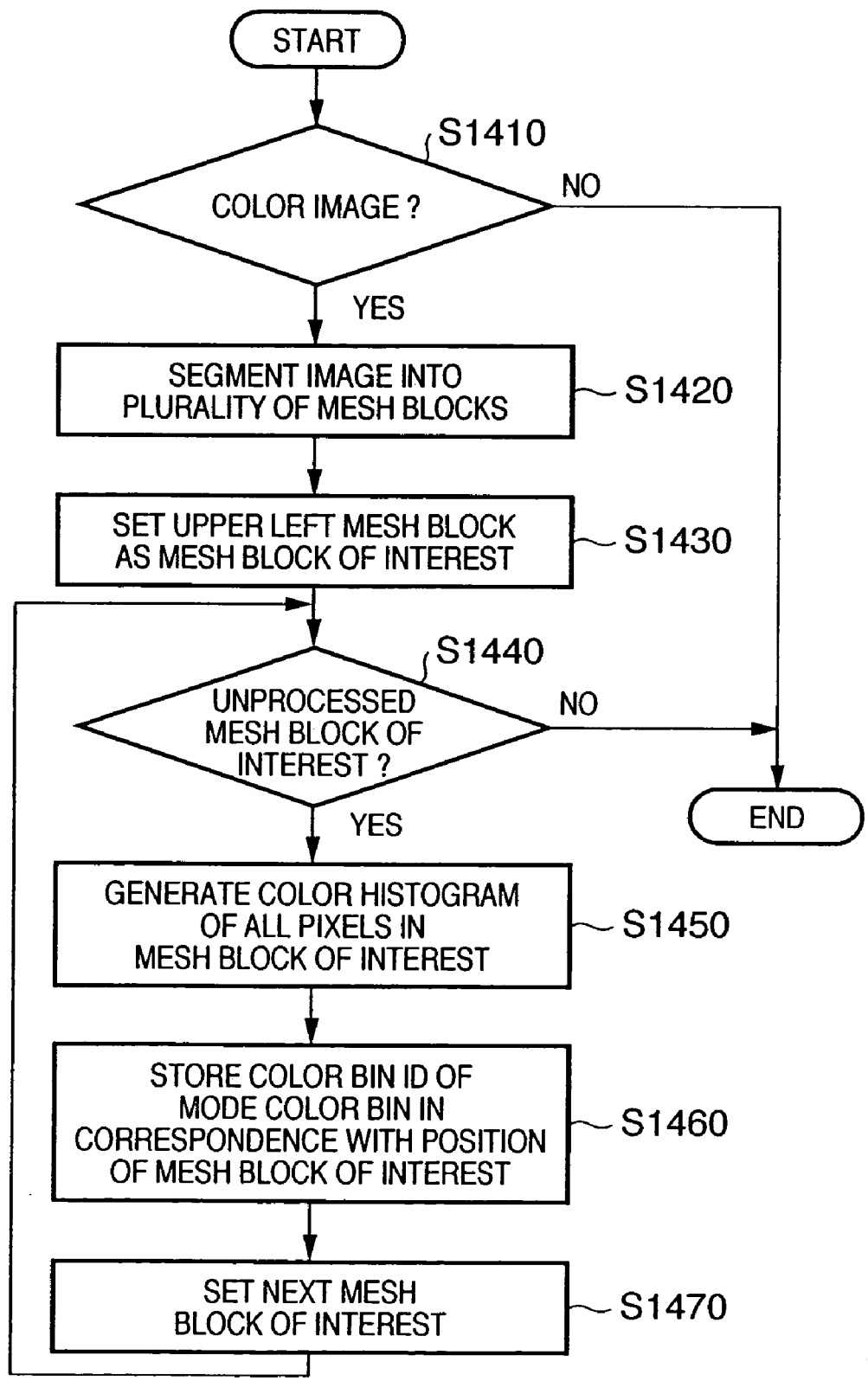
FIG. 14 is a flow chart showing details of a color feature information extraction process according to the embodiment of the present invention.

FIG. 14 is a flow chart showing details of the color feature information extraction process according to the embodiment of the present invention.

In this process, information which makes a color having a mode color in the color histogram of each mesh block prepared by segmenting an image to be processed into a plurality of mesh blocks and position information of the mesh block correspond to each other is extracted as color feature information.

In step S1410, whether an image to be processed is a color image is determined. This determination is performed similarly to step S1010 in FIG. 10.

If the image to be processed is a color image in step S1410 (YES in step S1410), the process advances to step S1420. If the image is not a color image (NO in step S1410), the process ends.

In step S1420, the image is segmented into a plurality of mesh blocks. In the embodiment, as shown in FIG. 11, the image is segmented into nine mesh blocks in the vertical and horizontal directions each. The embodiment exemplifies segmentation into 9×9=81 mesh blocks for illustrative convenience. In practice, the number of mesh blocks is preferably about 15×15=225.

In step S1430, a mesh block of interest to be processed is set to the upper left block. The mesh block of interest is set similarly to step S1040 in FIG. 10.

In step S1440, whether an unprocessed mesh block of interest exists is determined. If no unprocessed mesh block of interest exists (NO in step S1440), the process ends. If an unprocessed mesh block of interest exists (YES in step S1440), the process advances to step S1450.

In step S1450, the density values of all pixels in a mesh block of interest are projected into color bins serving as subspaces prepared by dividing the color space in FIG. 15, and the color histogram of the color bins is generated.

In the embodiment, the density values of all pixels in a mesh block of interest are projected into color bins prepared by dividing the RGB color space into 3×3×3=27, as shown in FIG. 15. In practice, the density values of all pixels in a mesh block of interest are more preferably projected into color bins obtained by dividing the RGB color space into 6×6×6=216.

In step S1460, the color bin ID of the mode color bin of the color histogram is determined as the representative color of the mesh block of interest. The determined color bin ID is stored in the storage unit 111 in correspondence with the mesh block of interest and its position.

In step S1470, the next mesh block of interest to be processed is set by looking up the order decision table in FIG. 12. The flow then returns to step S1440 to recursively repeat the processes in steps S1440 to S1470 until no unprocessed mesh block of interest exists.

By the above process, information which makes the representative color of each mesh block of an image (image block) to be processed and position information of the mesh block correspond to each other can be extracted as color feature information.

The determination process of determining whether an image to be processed is a color image in step S1010 of FIG. 10 or step S1410 of FIG. 14 will be explained with reference to FIG. 16.

As the determination method of the determination process, the simplest method is to analyze the data format of a reference comparison image and, when the reference comparison image is a monochrome or grayscale image, determine that color information of an image to be processed is insufficient because the image does not have any color information.

When the reference comparison image is a color image, the data format corresponds to a color image, but the image to be processed may be a grayscale image. Thus, even when the data format corresponds to a color image, whether color information of an image to be processed is sufficient must be strictly determined. The determination method utilizes analysis of the color of an image to be processed.

The gist of the analysis is to analyze the ratio of color information which occupies an image to be processed. When the ratio of color information to the image is equal to or higher than a predetermined threshold, the color information is determined to be sufficient. When the ratio is lower than the threshold, the color information is determined to be insufficient.

Figure 16:
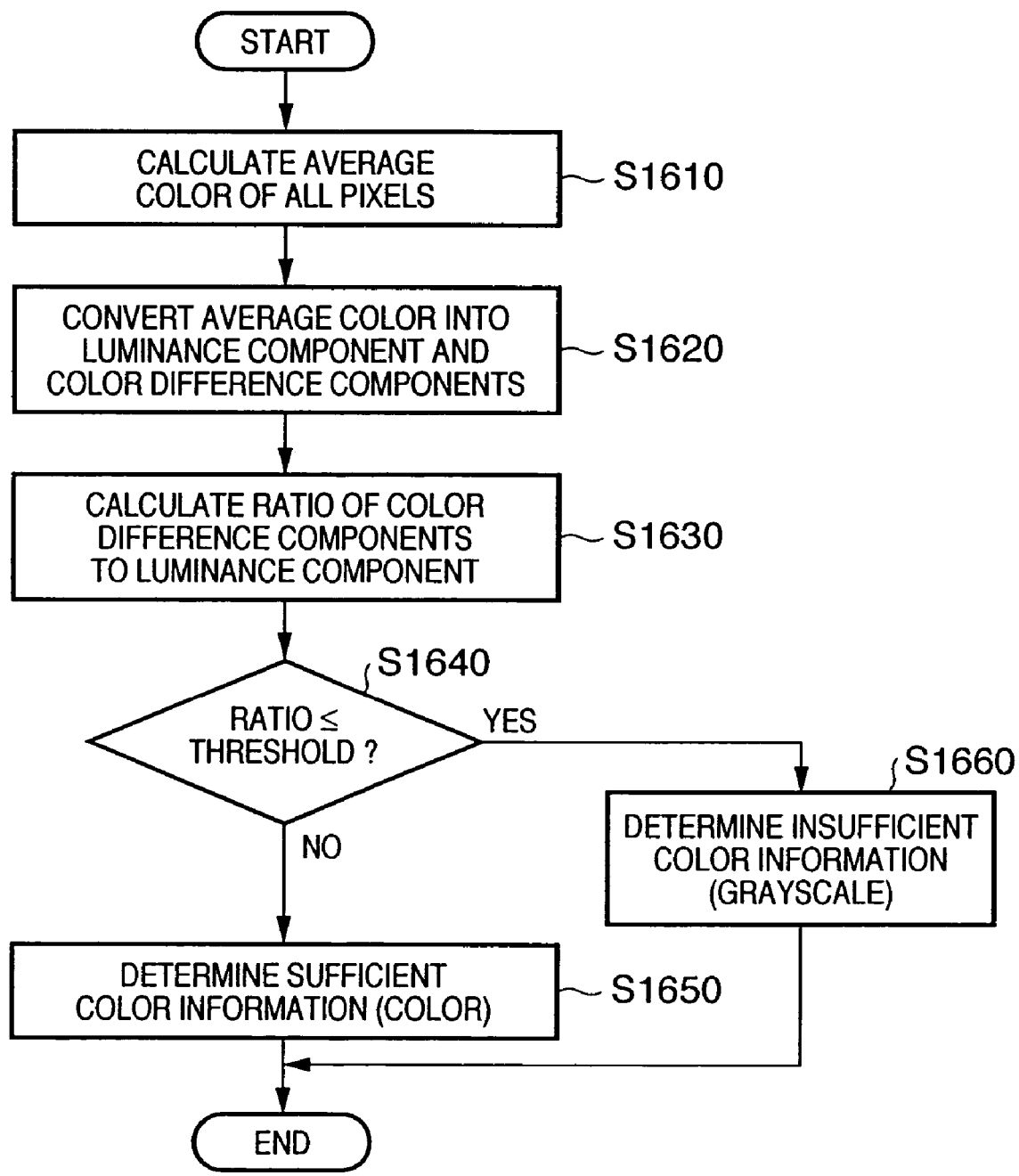
FIG. 16 is a flow chart showing details of a determination process according to the embodiment of the present invention.

FIG. 16 is a flow chart showing details of the determination process of determining whether color information is sufficient.

In step S1610, the average color of the colors of all pixels which form an image (image block) to be processed is calculated. In step S1620, the average color is converted into a luminance component and color difference components. In step S1630, a ratio R of the color difference component values to the luminance component value is calculated.

A separation method of separating the color into a luminance component and color difference components is a known method.

For example, when the YCbCr color space is adopted, relations with 24-bit R, G, and B values are given by $$Y=0.29900*R+0.58700*G+0.11400*B$$

$$Cb=-0.16874*R-0.33126*G+0.50000*B+128$$

$$Cr=0.50000*R-0.41869*G+(-0.08131)*B+128 \quad (2)$$

The calculated average color is separated into a luminance component Yave and color difference components Cbave and Crave in accordance with the equations (2) to calculate $$\text{Ratio}R=\text{sqrt}(Cbave*Cbave+Crave*Crave)/Yave \quad (3)$$

In step S1640, whether the ratio R is equal to or higher than a predetermined threshold is determined. If the ratio R is higher than the threshold (NO in step S1640), the process advances to step S1650 to determine that color information of the image to be processed is sufficient (i.e., the image is a color image). If the ratio R is equal to or lower than the threshold (YES in step S1640), the process advances to step S1660 to determine that color information of the image is insufficient (i.e., the image is a grayscale image).

A feature information extraction process for a text block will be explained.

When one document contains a plurality of text blocks, the following process is repeated by the total number of text blocks.

Feature amount information of a text block is a character code obtained by performing the OCR (Optical Character Recognition) process for the text block.

In the OCR (Optical Character Recognition) process, character recognition is done using pattern matching for the character image of each character extracted from a text block, thereby acquiring a corresponding character code.

In the character recognition process, a several ten-dimensional observation feature vector of a numerical value series converted from the feature of a character image and a dictionary feature vector obtained in advance for each character type are compared to output a character type with the shortest distance as a recognition result.

Extraction of a feature vector can be realized by various known methods. For example, a character is segmented into meshes, character lines in each mesh block are counted as linear elements in each direction, and a mesh count-dimensional vector is defined as a feature.

To execute character recognition for a text block extracted by the block selection process (step S3020 or S3120), whether the text block is a horizontal/vertical writing is determined. A character string is extracted in a corresponding direction, and then a character is extracted from the character string to acquire a character image.

In determination of a horizontal/vertical writing, horizontal/vertical projection to a pixel value within the text block is formed. The text block is determined to be a horizontal writing when the variance of horizontal projection is large, and a vertical writing when the variance of vertical projection is large. In decomposition into a character string and character, for a text block of a horizontal writing, a column is extracted using the horizontal projection, and a character is extracted from the vertical projection of the extracted column. For a text block of a vertical writing, the horizontal and vertical directions are reversed.

Details of the comparison process in step S3140 will be explained.

Figure 17:
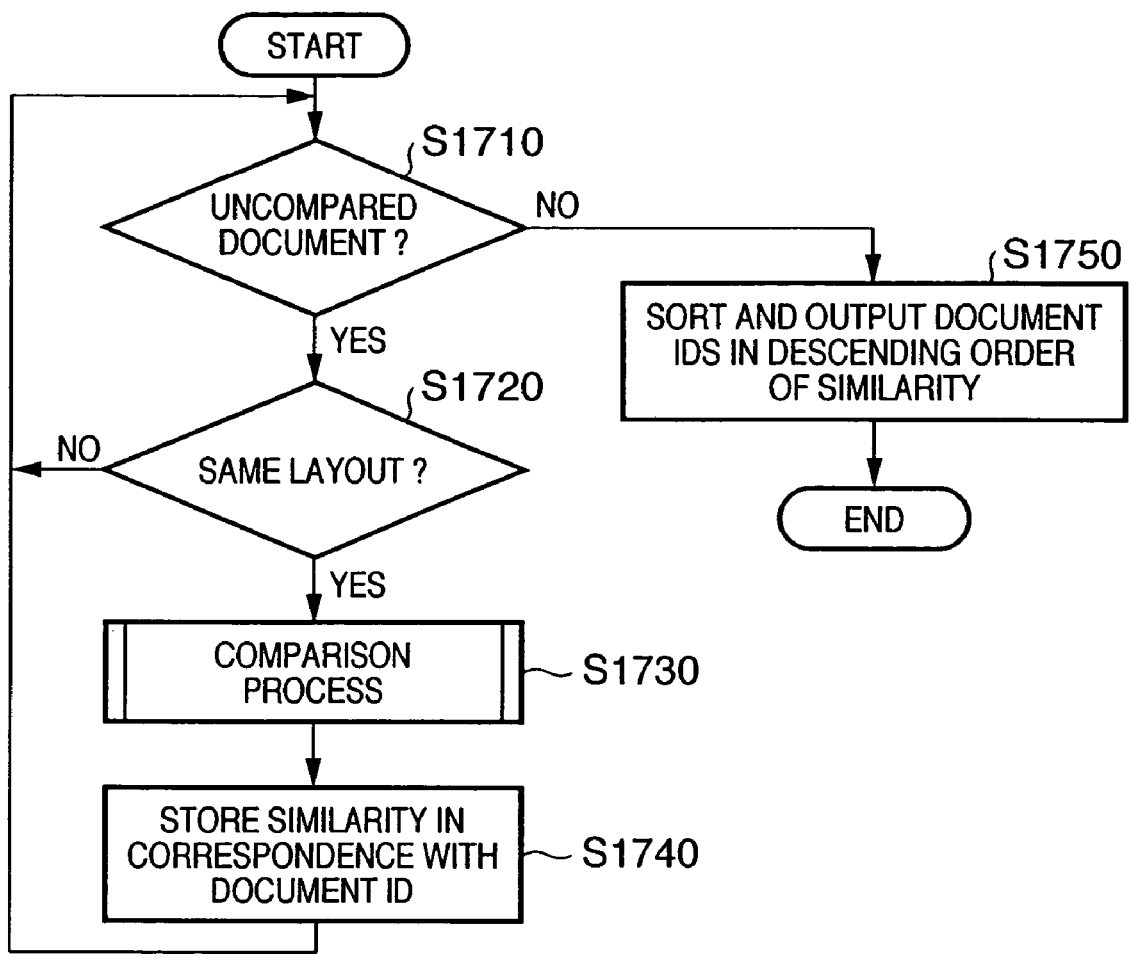
FIG. 17 is a flow chart showing details of a comparison process according to the embodiment of the present invention.

FIG. 17 is a flow chart showing details of the comparison process according to the embodiment of the present invention.

In step S1710, whether an uncompared original document exists is determined by referring to address information. If no uncompared original document exists (NO in step S1710), the process advances to step S1750. If an uncompared original document exists (YES in step S1710), the process advances to step S1720.

In step S1720, the layout is compared. The layout includes the attribute, size, and position of a block in block information. If the layouts of a reference comparison image (paper document) and target comparison image (electronic data) coincide with each other (YES in step S1720), the process advances to step S1730. If these layouts do not coincide with each other (NO in step S1720), the flow returns to step S1710.

In step S1730, a comparison process of comparing a block in the reference comparison image (paper document) and a block in the target comparison image (electronic data) is executed. This comparison is comprehensively performed using feature amounts corresponding to a character and image in accordance with the block attribute, thereby calculating similarity. Details of this process will be described later.

In step S1740, the similarity of the document is temporarily stored in the storage unit 111 in correspondence with the document ID of the target comparison image.

If all documents have been compared in step S1710, the process advances to step S1750 to sort and output document IDs in the descending order of similarities.

Details of the comparison process in step S1730 will be explained with reference to FIG. 18.

Figure 18:
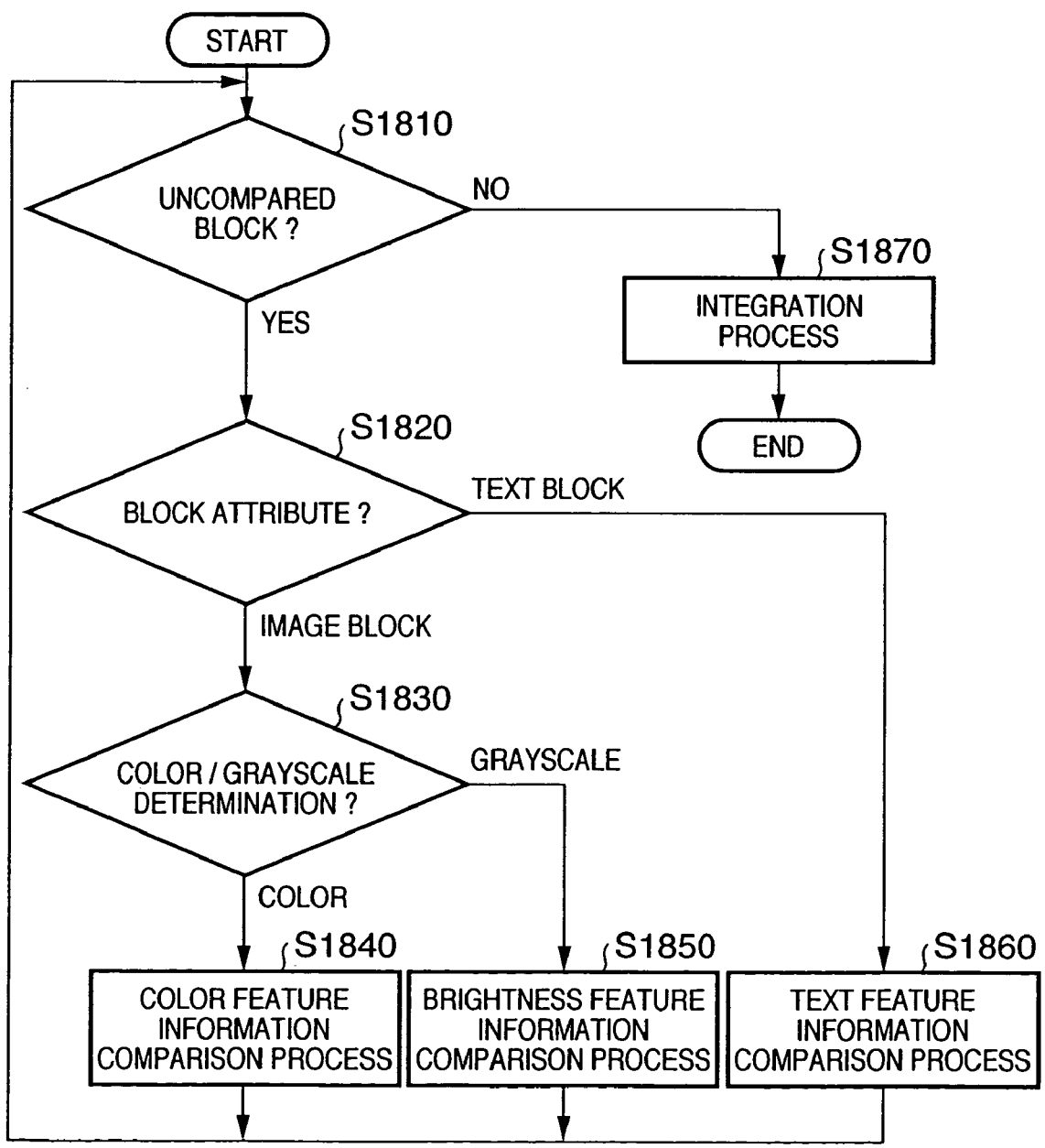
FIG. 18 is a flow chart showing details of another comparison process according to the embodiment of the present invention.

FIG. 18 is a flow chart showing details of the comparison process according to the embodiment of the present invention.

In step S1810, whether an uncompared block exists in electronic data corresponding to a document ID subjected to a process is determined by referring to block information. If no uncompared block exists (NO in step S1810), the process advances to step S1870. If an uncompared block exists (YES in step S1810), the process advances to step S1820.

In step S1820, the attribute of a block to be compared is determined. If the attribute exhibits an image block, the process advances to step S1830. If the attribute exhibits a text block, the process advances to step S1860.

When the attribute exhibits an image block, a determination process for color information in FIG. 16 is done in step S1830 to determine whether the image block is a color image (sufficient color information) or a grayscale image (insufficient color information).

If the reference comparison block is a color image (sufficient color information), the process advances to step S1840 to execute a color feature information comparison process which is a similarity comparison between the reference comparison block and the target comparison block on the basis of color feature amount information. Details of this process will be described later.

If the reference comparison block is a grayscale image (insufficient color information), the process advances to step S1850 to perform a brightness feature information comparison process which is a similarity comparison between the reference comparison block and the target comparison block on the basis of brightness feature amount information. Details of this process will be described later.

The similarity obtained by each process is temporarily stored in the storage unit 111 in correspondence with the document ID and block ID of the target comparison block. Accordingly, a similarity comparison process can be achieved by a method suited to the type of image of the reference comparison block regardless of whether the reference comparison block is a grayscale or color image.

When the attribute indicates a text block, a text feature information comparison process which is a similarity comparison between the reference comparison block and the target comparison block on the basis of text feature amount information is executed in step S1860. Details of this process will be described later. The similarity obtained by this process is temporarily stored in the storage unit 111 in correspondence with the document ID and block ID of the target comparison block.

If comparisons with all blocks end in step S1810, the process advances to step S1870 to perform an integration process of integrating the similarities of all blocks contained in the target comparison document (electronic data) that are stored in the storage unit 111 by the processes in steps S1840 to S1860, and calculating the similarity between the paper document serving as a retrieval condition and the original document.

Details of the color feature information comparison process in step S1840 will be described with reference to FIG. 19.

Figure 19:
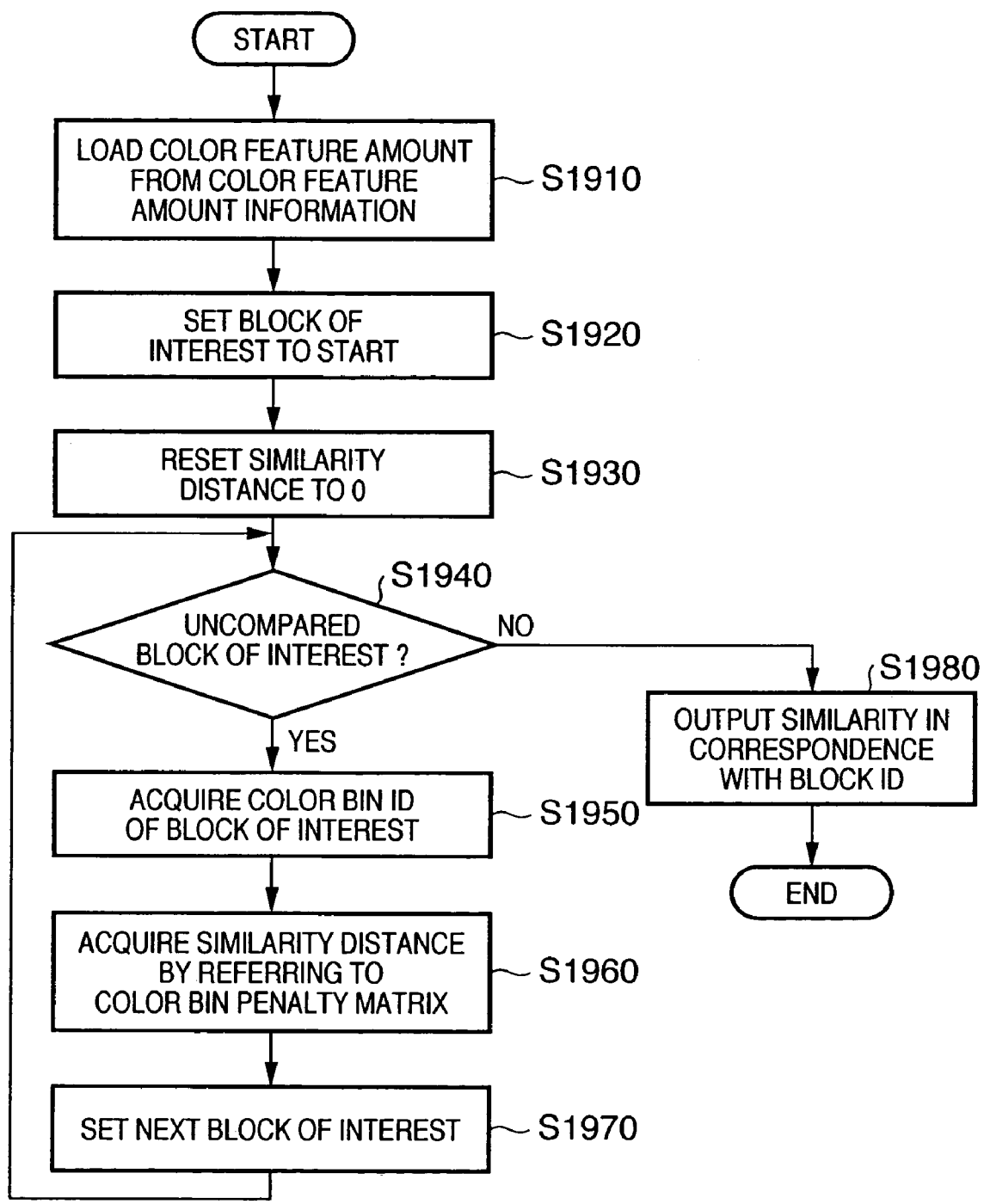
FIG. 19 is a flow chart showing details of a color feature information comparison process according to the embodiment of the present invention.

FIG. 19 is a flow chart showing details of the color feature information comparison process according to the embodiment of the present invention.

In step S1910, the color feature amounts of a reference comparison image block and target comparison image block are read out from color feature amount information.

In step S1920, a mesh block of interest in an image block to be processed is set as the start block. In step S1930, the similarity distance representing the similarity between the color feature amount of the reference comparison image block and that of the target comparison image block is reset to 0.

In step S1940, whether an uncompared mesh block of interest exists is determined. If no uncompared mesh block of interest exists (NO in step S1940), the process advances to step S1980. If an uncompared mesh block of interest exists (YES in step S1940), the process advances to step S1950.

In step S1950, the color bin IDs of mesh blocks of interest are acquired from the color feature amounts of the reference comparison image block and target comparison image block.

Figure 20:
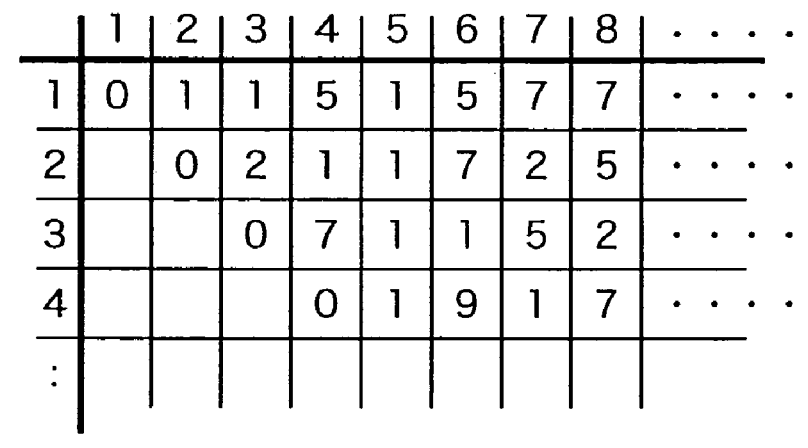

In step S1960, the local similarity distance of the mesh block of interest that corresponds to the interval between the acquired color bin IDs is acquired by referring to a color bin penalty matrix in FIG. 20. The local similarity distance is added to the similarity distance acquired in the immediately preceding process. The similarity distance is stored in the storage unit 111.

The color bin penalty matrix will be explained with reference to FIG. 20.

FIG. 20 is a view showing the structure of the color bin penalty matrix according to the embodiment of the present invention.

The color bin penalty matrix manages the local similarity distance between color bin IDs. In FIG. 20, the color bin penalty matrix is configured such that the similarity distance is 0 for the same color bin ID, and as the difference between color bin IDs increases, i.e., the similarity decreases, the similarity distance increases. Diagonal positions for the same color bin ID have a similarity distance of 0, and color bin IDs are symmetrical about the similarity distance of 0.

In the embodiment, the similarity distance between color bin IDs can be acquired only by referring to the color bin penalty matrix, attaining high processing speed.

In step S1970, the next mesh block of interest to be processed is set by looking up the order decision table in FIG. 12. After that, the flow returns to step S1940.

If no uncompared mesh block of interest exists in step S1940 (NO in step S1940), the process advances to step S1980 to convert the similarity distance stored in the storage unit 111 into a similarity and output the similarity paired with the block ID.

Conversion into the similarity assumes that the similarity is 100% for a minimum value of the similarity distance and 0% for a maximum value of the similarity distance. The similarity to the similarity distance within this range is calculated on the basis of the difference from the minimum or maximum value.

Details of the brightness feature information comparison process in step S1850 will be described with reference to FIG. 21.

Figure 21:
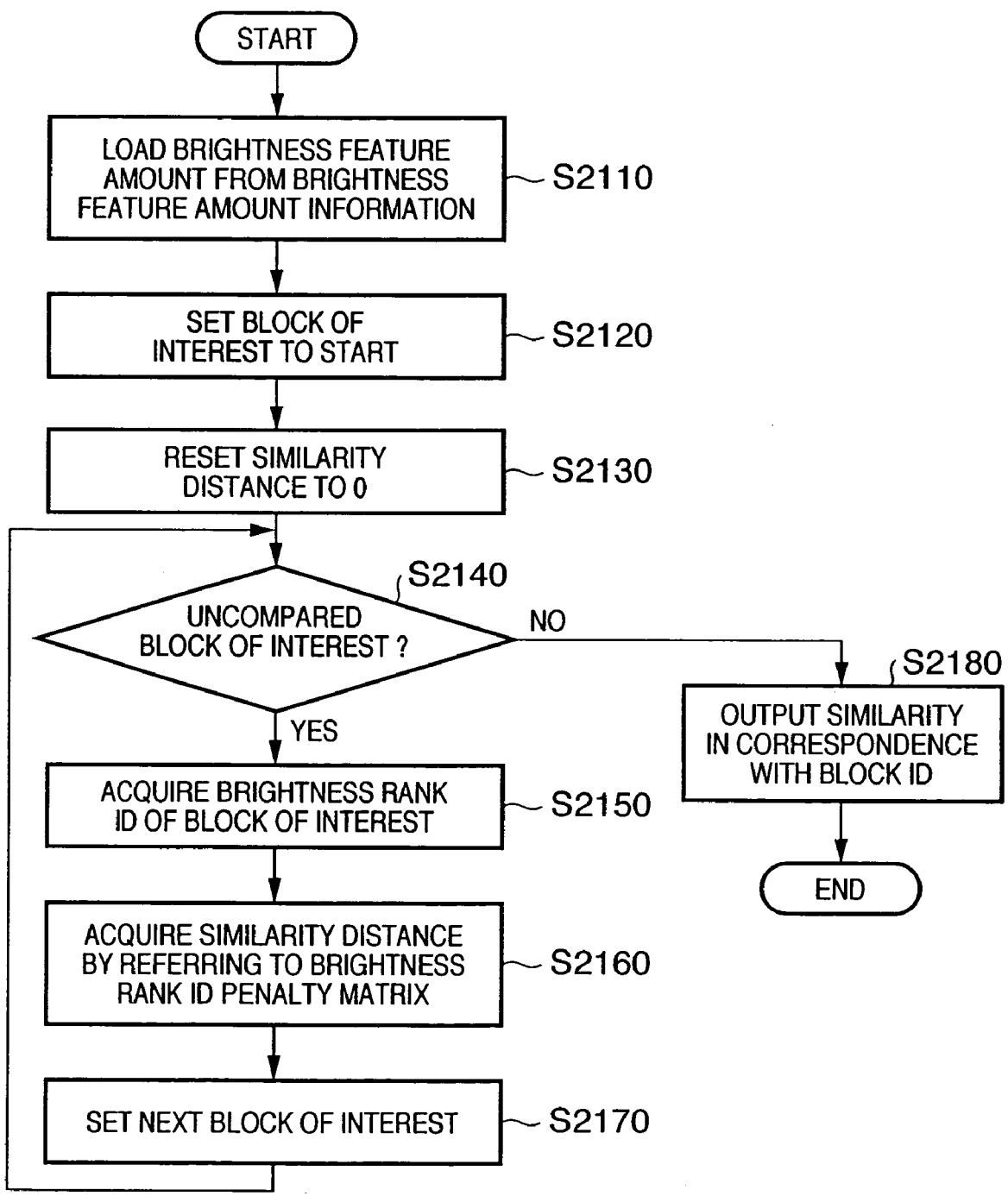
FIG. 21 is a flow chart showing details of a brightness feature information comparison process according to the embodiment of the present invention.

FIG. 21 is a flow chart showing details of the brightness feature information comparison process according to the embodiment of the present invention.

In step S2110, the brightness feature amounts of a reference comparison image block and target comparison image block are read out from brightness feature amount information.

In step S2120, a mesh block of interest in an image to be processed is set as the start block. In step S2130, the similarity distance representing the similarity between the brightness feature amount of the reference comparison image block and that of the target comparison image block is reset to 0.

In step S2140, whether an uncompared mesh block of interest exists is determined. If no uncompared mesh block of interest exists (NO in step S2140), the process advances to step S2180. If an uncompared mesh block of interest exists (YES in step S2140), the process advances to step S2150.

In step S2150, the brightness rank IDs of the brightnesses of mesh blocks of interest are acquired from the brightness feature amounts of the reference comparison image block and target comparison image block.

In step S2160, the local similarity distance of the mesh block of interest that corresponds to the interval between the acquired brightness rank IDs is acquired by referring to a brightness rank ID penalty matrix in FIG. 22. The local similarity distance is added to the similarity distance acquired in the immediately preceding process. The similarity distance is stored in the storage unit 111.

The brightness rank ID penalty matrix will be explained with reference to FIG. 22.

FIG. 22 is a view showing the structure of the brightness rank ID penalty matrix according to the embodiment of the present invention.

The brightness rank ID penalty matrix manages the local similarity distance between brightness rank IDs. In FIG. 22, the brightness rank ID penalty matrix is designed such that the similarity distance is 0 for the same brightness rank ID, and as the difference between brightness rank IDs increases, i.e., the similarity decreases, the similarity distance increases. Diagonal positions for the same brightness rank ID have a similarity distance of 0, and brightness rank IDs are symmetrical about the similarity distance of 0.

In the embodiment, the similarity distance between brightness rank IDs can be acquired only by referring to the brightness rank ID penalty matrix, thereby increasing the processing speed.

In step S2170, the next mesh block of interest to be processed is set by looking up the order decision table in FIG. 12. The flow then returns to step S2140.

If no uncompared mesh block of interest exists in step S2140 (NO in step S2140), the process advances to step S2180 to convert the similarity distance stored in the storage unit 111 into a similarity and output the similarity paired with the block ID.

Conversion into the similarity assumes that the similarity is 100% for a minimum value of the similarity distance and 0% for a maximum value of the similarity distance. The similarity to the similarity distance within this range is calculated on the basis of the difference from the minimum or maximum value.

Details of the text feature information comparison process in step S1860 will be described.

In this process, character codes in the text blocks of a reference comparison image and target comparison image are compared to calculate the similarity from the coincidence between the character codes.

In a comparison between a paper document serving as a retrieval condition and an original document, the similarity is ideally 100%. In practice, a recognition error may occur in the OCR process for a text block in a paper document serving as a retrieval condition. Thus, even a comparison with an original document may not attain a similarity of 100%, but has a similarity of almost 100%.

Details of the integration process in step S1870 will be explained.

In the integration process, the calculated similarities of blocks are integrated such that the similarity of a block which occupies a large part of an original document serving as a target comparison image is reflected at a higher ratio in the similarity of the whole original document.

Assume that blocks B1 to B6 in an original document have calculated similarity ratios n1 to n6. At this time, an integrated similarity ratio N of the entire original document is given by $$N = w1*n1 + w2*n2 + w3*n3 + \ldots + w6*n6 \quad (4)$$

where w1 to w6 are weighting factors for evaluating the similarities of blocks. The weighting factors w1 to w6 are calculated from ratios at which respective blocks occupy an original document. For example, for sizes S1 to S6 of blocks 1 to 6, the occupation ratio w1 of block 1 can be calculated by $$w1 = S1/(S1 + S2 + \ldots + S6) \quad (5)$$

By the weighting process using the occupation ratio, the similarity of a block which occupies a large part of an original document can be reflected at a higher ratio in the similarity of the whole original document.

Details of a process in the confirmation mode in steps S3150 and S3160 will be explained.

The confirmation mode may be designated automatically or from a user interface by the user in advance. The automatic determination method is as follows. For example, when only one original document candidate is retrieved, or when the differences in similarity between the first original document candidate and the second and subsequent original document candidates are equal to or larger than a predetermined value and the first original document candidate is more likely to be a desired original document, a "non-confirmation mode" is determined and the process advances to step S3170; otherwise, the "confirmation mode" is determined.

In the "confirmation mode", original document candidates are displayed in a user interface implemented by the display 116 and input unit 113 of the MFP 100, and the user is prompted to select a desired original document from the displayed candidates.

In this manner, automatic determination of whether to execute the confirmation mode can eliminate original document selection operation by the user, reducing the number of operation steps.

An example of the user interface in the confirmation mode will be described with reference to FIG. 23.

FIG. 23 is a view showing an example of the user interface according to the embodiment of the present invention.

Reference numeral 2311 denotes a display/operation panel. Reference numerals 2312 to 2315 denote various function buttons which are used to designate printing, distribution, storage, and editing of an image to be processed. The buttons 2312 to 2315 may be clicked in advance or designated after designating an original document.

Reference numeral 2316 denotes a start button which is clicked to execute a function selected with a function button. Reference numeral 2317 denotes a display area which is formed by a touch panel and can be directly touched by the user to designate selection.

Reference numeral 2318 denotes a mode display area which represents the confirmation mode in FIG. 23. The mode display area 2318 generally displays an automatically determined mode. By touching the mode display area 2318, the "confirmation mode" and "non-confirmation mode" can be cyclically designated.

Reference numerals 2319 to 2328 denote thumbnail images of original document candidates to be output as retrieval results. The thumbnail images are displayed in the descending order of similarity with numbers from 2319. In this example, a maximum of 10 thumbnail images are displayed, and if more than 10 thumbnail images exist, up to 10 thumbnail images are displayed. A desired thumbnail image is selected from the thumbnail images 2319 to 2328, thereby selecting a desired original document. The selected original document can undergo various processes.

As described above, according to the embodiment, color image electronic data of the original document of a paper document can be retrieved from even an electronic image of a grayscale printed material of the color image electronic data or grayscale image electronic data of the color image electronic data. This retrieval can be implemented at high precision without any special change for retrieving an image from original image electronic data.

Regardless of whether an electronic paper document image serving as a retrieval condition is a color or grayscale image, an original document can be retrieved by a method suitable for the type of image.

If retrieval results cannot be narrowed down to one, retrieval result candidates are presented to the user to prompt him/her to freely select one of them.

In the brightness feature information extraction process of FIG. 10 according to the embodiment, the mode brightness of an image to be processed is extracted as brightness feature information. The present invention is not limited to this, and for example, an average brightness may be extracted as brightness feature information.

The grayscale feature amount of a grayscale image is brightness feature information, as shown in FIG. 21. The present invention is not limited to this, and may adopt one or an arbitrary combination of a plurality of types of grayscale feature amounts such as a texture feature amount expressed by a cooccurrence matrix, contrast, entropy, Gabor transformation, or the like and a shape feature amount expressed by an edge, Fourier descriptor, or the like.

In the color feature information extraction process of FIG. 14, the mode color of an image to be processed is extracted as color feature information. The present invention is not limited to this, and for example, an average color may be extracted as color feature information.

A comparison is done using a feature amount suited to the type of image such as a color or grayscale image. If the precision permits, even a color image is compared using only a feature amount for a similarity comparison of a grayscale image.

Also, the block selection process is performed to segment a document to be processed into a text block and image block, and retrieval is done comprehensively using the feature amounts of these blocks. Alternatively, the entire document may be regarded as one image to retrieve an original document. If the precision permits, the original document may be retrieved using only an image block in the document.

Electronic data is temporarily converted into a raster image, but a character code or image may be directly extracted from electronic data and compared.

In the block selection process, a document to be processed is segmented into blocks, and then the image block undergoes color/grayscale determination in FIG. 16. Alternatively, color/grayscale determination may be done in block selection, and a color image/grayscale image may be added as an attribute to the image block.

Color/grayscale determination is executed for each image block in retrieval, but may be performed in advance using the image of the entire document.

Color/grayscale determination is automatically done, but may be designated by the user.

The text feature amount employs a character code. Instead, the part of speech of a word may be extracted in advance by matching with a word dictionary, and a noun may be defined as a text feature amount.

The image processing apparatus in the above-described embodiment can be implemented by an information processing apparatus such as a personal computer or can be interpreted as an invention of a method serving as procedures which realize the functions of the image processing apparatus. Since the image processing apparatus can be realized by a computer, the present invention can be apparently applied to a computer program running in each apparatus, and also a computer-readable storage medium such as a CD-ROM which stores the computer program and allows a computer to load it.

The embodiment has been described in detail above. The present invention can take claims of a system, apparatus, method, program, storage medium, and the like. More specifically, the present invention may be applied to a system including a plurality of devices or an apparatus formed by a single device.

The present invention is also achieved by supplying a software program (in the above embodiment, programs corresponding to flow charts shown in the drawings) for realizing the functions of the above-described embodiment to a system or apparatus directly or from a remote place, and reading out and executing the supplied program codes by the computer of the system or apparatus.

Hence, the present invention is realized by program codes installed in the computer in order to realize the functional processes of the present invention by the computer. That is, the present invention includes a computer program for realizing the functional processes of the present invention.

In this case, the present invention can take any program form such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can also be supplied by connecting a client computer to an Internet Web page via the browser of the client computer, and downloading the computer program of the present invention or a compressed file containing an automatic installing function from the Web page to a recording medium such as a hard disk. The program can also be realized by grouping program codes which form the program of the present invention into a plurality of files, and downloading the files from different Web pages. That is, the present invention also includes a WWW server which allows a plurality of users to download the program files for realizing the functional processes of the present invention by a computer.

The program of the present invention can also be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiment are realized when the computer executes the readout program. Also, the functions of the above-described embodiment are realized when an OS or the like running on the computer performs some or all of actual processes on the basis of the instructions of the program.

The functions of the above-described embodiment are also realized when the program read out from the storage medium are written in the memory of a function expansion board inserted into the computer or the memory of a function expansion unit connected to the computer, and then the CPU of the function expansion board or function expansion unit performs some or all of actual processes on the basis of the instructions of the program.

As has been described above, according to the present invention, original color electronic data can be retrieved from a paper document printed in the grayscale, and utilized. This can be realized without changing the original, and data can be retrieved at high precision. Not only a scanned image of a paper document but also an electronic file of the paper document that is created by word processing software can also be easily exploited. Retrieval can be done by an appropriate method regardless of whether the paper document is a color or grayscale image. Even if retrieval results cannot be narrowed down to one, the user can be prompted to select one of the candidates.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:

storage means for storing a plurality of electronic data as target comparison images;

input means for inputting a reference comparison image obtained from a printed material;

segmentation means for segmenting the reference comparison image into a plurality of regions based on an attribute;

grayscale feature amount extraction means for extracting a grayscale feature amount from a region having a predetermined attribute among the plurality of regions segmented by said segmentation means;

retrieval means for retrieving a target comparison image corresponding to the reference comparison image from said storage means by using the grayscale feature amount extracted by said grayscale feature amount extraction means; and processing means for extracting the image retrieved by said retrieval means from said storage means and processing the extracted image.

2. The apparatus according to claim 1, wherein the grayscale feature amount includes at least one of: a brightness feature amount, a texture feature amount, and a shape feature amount of the reference comparison image.

3. The apparatus according to claim 1, wherein said retrieval means compares a grayscale feature amount extracted from the region having the predetermined attribute of the reference comparison image and a grayscale feature amount of the target comparison image, and outputs a similar target comparison image as a retrieval result.

4. The apparatus according to claim 1, further comprising:

color feature amount extraction means for extracting a color feature amount of the region having the predetermined attribute of the reference comparison image; and determination means for determining whether the color information extracted by said color feature amount extraction means is sufficient, wherein said retrieval means retrieves the target comparison image corresponding to the reference comparison image from said storage means based on the color feature amount of a region whose color information is determined by said determination means to be sufficient and the grayscale feature amount of a region whose color information is determined by said determination means not to be sufficient.

5. The apparatus according to claim 4, wherein the color feature amount includes at least one of a mode color and an average color in the reference comparison image.

6. The apparatus according to claim 4, further comprising:

text feature amount extraction means for extracting a text feature amount from the segmented region having a text attribute of the reference comparison image;

wherein said retrieval means retrieve the target comparison image corresponding to the reference comparison image from said storage means based on the color feature amount of a region whose color information is determined by said determination means to be sufficient, the grayscale feature amount of a region whose color information is determined by said determination means not to be sufficient, and the next feature amount extracted by said text feature extraction means.

7. The apparatus according to claim 1, further comprising: display means for displaying a retrieval result of said retrieval means; and selection means for, when said display means displays a plurality of target comparison images as the retrieval result of said retrieval means, selecting a desired image from the plurality of target comparison images, wherein said processing means extracts the image selected by said selection means from said storage means, and executes a process for the extracted image.

8. The apparatus according to claim 1, further comprising:

designation means for designating a user-desired process for the image retrieved by said retrieval means, wherein said processing means extracts the retrieved image and executes the process designated by said designation means.

9. The apparatus according to claim 8, wherein said designation means designates at least one of: a printing process a distribution process, a storage process, and an editing process.

10. The apparatus according to claim 1, wherein the predetermined attribute is an image attribute.

11. The apparatus according to claim 1, further comprising:

text feature amount extraction means for extracting a text feature amount from the segmented region having a text attribute of the reference comparison image, wherein said retrieval means retrieves the target comparison image corresponding to the reference comparison image from said storage means by using the grayscale feature amount extracted by said grayscale feature amount extraction means and the text feature amount extracted by said text feature amount extraction means.

12. The apparatus according to claim 1, further comprising registration means for extracting a feature amount from a registration image and registering the feature amount of the registration image as the feature amount of the target image in said storage means.

13. The apparatus according to claim 12, wherein the feature amount extracted by said registration means includes the grayscale feature amount.

14. The apparatus according to claim 12, further comprising:

segmentation means for segmenting the registration image into a plurality of regions based on an attribute, wherein said registration means extracts and registers a feature amount corresponding to an attribute of the region segmented by said segmentation means.

15. An image processing method comprising:

an input step of inputting a reference comparison image obtained from a printed material;

a segmentation step of segmenting the reference comparison image into a plurality of regions based on an attribute;

a grayscale feature amount extraction step of extracting a grayscale feature amount from a region having a predetermined attribute among the plurality of regions segmented in the segmentation step;

a retrieval step of retrieving a target comparison image corresponding to the reference comparison image from a plurality of electronic data stored as target comparison images in a storage medium, by using the grayscale feature amount extracted in the grayscale feature amount extraction step; and a process step of extracting the image retrieved in the retrieval step from the storage medium and processing the extracted image.

16. A computer-readable storage medium storing a computer program for implementing an image processing method, the computer program comprising:

a program code for an input step of inputting a reference comparison image obtained from a printed material;

a program code for a segmentation step of segmenting the reference comparison image into a plurality of regions based on an attribute;

a program code for a grayscale feature amount extraction step of extracting a grayscale feature amount from a region having a predetermined attribute among the plurality of regions segmented in the segmentation step;

a program code for a retrieval step of retrieving a target comparison image corresponding to the reference comparison image from a plurality of electronic data stored as target comparison images in a storage medium, by using the grayscale feature amount extracted in the grayscale feature amount extraction step; and a program code for a process step of extracting the image retrieved in the retrieval step from the storage medium and processing the extracted image.

* * * * *

UNITED STATES PATENT AND TRADEMARK OFFICE
CERTIFICATE OF CORRECTION

PATENT NO.       : 7,272,269 B2
APPLICATION NO.  : 10/828476
DATED            : September 18, 2007
INVENTOR(S)      : Hiroshi Tojo et al.

Page 1 of 1

It is certified that error appears in the above-identified patent and that said Letters Patent is hereby corrected as shown below:

COLUMN 2

Line 34, "comprises of" should read --is comprised of--.

COLUMN 8

Line 13, "saved" should read --is saved--.

COLUMN 20

Line 44, "are written" should read --is written--.
    Line 66, "appraise" should read --apprise--.

COLUMN 21

Line 55, "retrieve" should read --retrieves--.
    Line 62, "next" should read --text--.

Signed and Sealed this

Thirteenth Day of May, 2008

JON W. DUDAS
*Director of the United States Patent and Trademark Office*